United States Patent
Bickel

(10) Patent No.: US 7,716,012 B2
(45) Date of Patent: May 11, 2010

(54) METHOD FOR PROCESS MONITORING IN A UTILITY SYSTEM

(76) Inventor: Jon A. Bickel, 3123 Monarch Dr., Murfreesboro, TN (US) 37129

( * ) Notice: Subject to any disclaimer, the term of this patent is extended or adjusted under 35 U.S.C. 154(b) by 288 days.

(21) Appl. No.: 12/069,862

(22) Filed: Feb. 13, 2008

(65) Prior Publication Data

US 2009/0204368 A1  Aug. 13, 2009

(51) Int. Cl.
G06F 17/18 (2006.01)
G06F 11/00 (2006.01)
(52) U.S. Cl. ................ 702/179; 702/180; 702/188; 702/189
(58) Field of Classification Search .......... 702/60–62, 702/179–189
See application file for complete search history.

(56) References Cited

U.S. PATENT DOCUMENTS

| | | | | |
|---|---|---|---|---|
| 6,639,518 | B1 | 10/2003 | Curtis | 340/635 |
| 7,272,518 | B2 | 9/2007 | Bickel et al. | 702/61 |
| 7,349,815 | B2 | 3/2008 | Bickel et al. | 702/60 |
| 2007/0005275 | A1* | 1/2007 | Bickel et al. | 702/60 |
| 2007/0005277 | A1* | 1/2007 | Bickel et al. | 702/61 |

FOREIGN PATENT DOCUMENTS

EP  1734342 A1  12/2006

OTHER PUBLICATIONS

Written Opinion corresponding to co-pending International Patent Application Serial No. PCT/US2009/033778, European Patent Office, dated Dec. 4, 2009, 6 pages.
International Search Report corresponding to co-pending International Patent Application Serial No. PCT/US2009/033778, European Patent Office, dated Dec. 4, 2009, 3 pages.

* cited by examiner

Primary Examiner—Eliseo Ramos Feliciano
Assistant Examiner—Phuong Huynh

(57) ABSTRACT

A process monitoring method that aggregates monitoring devices and optionally sensors into one or more groups that are each related to a process of a utility system. The monitoring devices are organized into a monitoring system hierarchy manually or automatically. A process algorithm determines from the hierarchy which monitoring devices are connected to a load. Monitored data from load-connected monitoring device pairs are correlated to produce a correlation coefficient that is compared against a correlation threshold selected between 0 and 1. When the correlation coefficient exceeds the threshold, the device pair is grouped into a process group. Other device pairs exceeding the threshold are likewise grouped into the process group. Multiple processes may be determined with the process algorithm. Sensors may also be grouped manually with the process group containing monitoring devices, which may include virtual monitoring devices. Alarms associated with monitoring devices and sensors are aggregated into one process alarm.

16 Claims, 9 Drawing Sheets

METHOD FOR PROCESS MONITORING IN A UTILITY SYSTEM

CROSS-REFERENCE TO RELATED APPLICATION

This application is related to U.S. Pat. No. 7,272,518, titled "Automated Hierarchy Classification in Utility Monitoring Systems," issued Sep. 18, 2007.

FIELD OF THE INVENTION

Aspects disclosed herein relate generally to utility systems, and, in particular, to a method for process monitoring in a utility system.

BACKGROUND

Today's utility monitoring systems provide end-users with the capability to alarm on a vast array of anomalous parameters. For example, many electrical system monitoring devices can detect and notify the end-user of overvoltage transient events, voltage sags, excessive voltage unbalance, harmonic distortion issues, etc. Although each of these alarms is beneficial, an end-user's "big picture" understanding of the overall condition of a utility monitoring system may be clouded by the details from so many discrete alarms. The sheer number of discrete alarms can be overwhelming and tend to obfuscate rather than pinpoint the source(s) of the problem by inundating the end-user with redundant information. Furthermore, the end-user may not fully comprehend the impact (or potential impact) of an event as indicated by a discrete alarm within their facility because it can be difficult to determine how the various alarms interrelate with one another.

What is needed, therefore, is an automated data integration technique, including automatic precision alignment of data and automatic hierarchical classification of system layout. The present invention is directed to satisfying this and other needs.

BRIEF SUMMARY

Aspects disclosed herein allow the end-user to monitor processes easily within a utility monitoring system to make a simpler assessment of the "big picture" impact of discrete events to the respective processes. As used herein, an "event" includes any utility parameter(s) excursion outside of a predetermined threshold. The occurrence of a problem associated with an apparatus at a single facility may adversely affect more than just that apparatus—the problem may directly or indirectly affect the entire process employing the apparatus. Some of the aforementioned adverse "affects" may include damaged equipment, reduced efficiency, shorter life expectancy, loss of product and/or revenue, degraded product quality, injured reputation, supplemental expenses, additional maintenance, and unscheduled downtime, to name a few. Aspects disclosed herein provide the end-user with a better scope on how an event can or will impact their equipment, processes, and products.

Briefly, according to an embodiment of the present invention, a method of aggregating monitoring devices and sensors in a utility system into one or more groups includes: receiving at time intervals device data measured by each of the monitoring devices; determining how the monitoring devices are linked together in a hierarchy to produce data representing the hierarchy; responsive to the producing the data representing the hierarchy, identifying a first of the monitoring devices that is connected to a first load in the utility system and a second of the monitoring devices that is connected to a second load in the utility system; determining whether a first correlation coefficient exceeds a predetermined threshold value, the first correlation coefficient being calculated from the device data measured by the first monitoring device and from the device data measured by the second monitoring device; if the first correlation coefficient exceeds the predetermined threshold value, grouping the first device and the second device into a first group; and storing in a memory a representation of the first group.

The method may further include: automatically calculating a second correlation coefficient associated with each non-identical pair of the monitoring devices indicative of whether the non-identical pair is directly linked, indirectly linked, or not linked together in the hierarchy to produce a plurality of second correlation coefficients; and automatically setting the threshold value by: determining which of the second plurality of correlation coefficients, associated with the non-identical pairs that are directly linked together or indirectly linked together, has a minimum value; and equating the threshold value to said minimum value.

The method may further include: receiving sensor data from at least one sensor in the utility system, the sensor data representing at least one characteristic being sensed by the at least one sensor; and grouping the at least one sensor into the first group. The method may further include receiving an alarm communicated from the first device or the second device; and displaying an indication that the alarm is associated with the first group.

The method may further include: aggregating alarm data associated with the first device and the second device such that an alarm indicated by the first device or the second device is indicated as a single alarm associated with the first group; and storing the indication that the alarm is associated with the first group.

The method may further include: receiving an alarm associated with an anomaly sensed by the at least one sensor; and displaying an indication that the alarm is associated with the first group.

The first device and the second device may not be linked together in the hierarchy or they may be linked (directly or indirectly) together in the hierarchy.

The method may further include: grouping at least a third device into a second group; and combining the first group with the second group.

The method may further include breaking up said first group into a plurality of subgroups by disaggregating at least the first device or the second device from the first group into a different group.

The device data may be indicative of at least one of power, voltage, current, voltage distortion, BTU per hour, MBTU per hour, energy, gallons per minute, or cubic feet per minute. The utility may be selected from the group consisting of water, air, gas, electricity, and steam (WAGES). The devices may be monitoring devices that monitor and quantify at least one of power, energy, volume per minute, volume, temperature, pressure, or flow rate.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
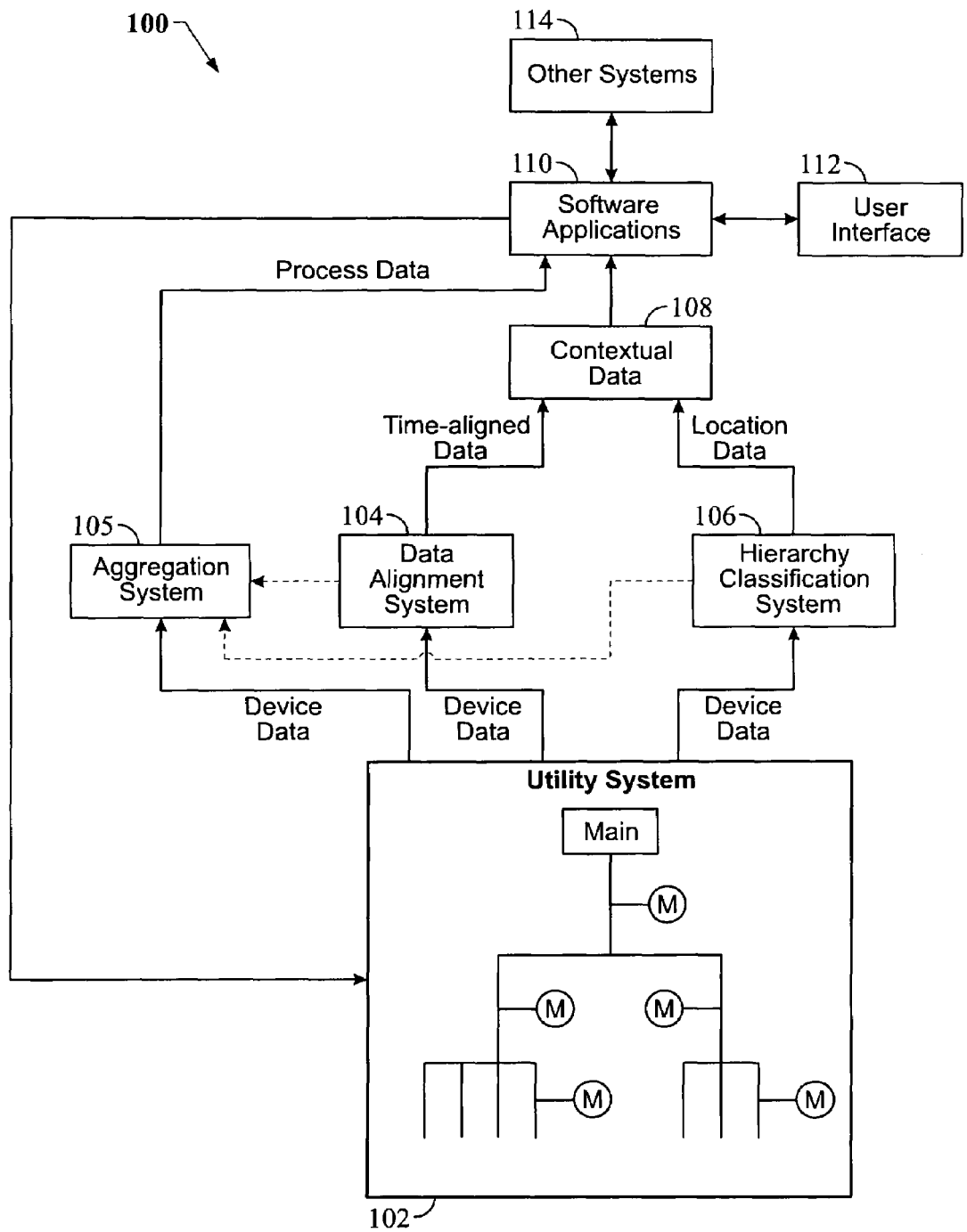
FIG. 1 is functional block diagram of an automated data integration monitoring system that includes an aggregation system in accordance with aspects of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Turning now to FIG. 1, an automated data integrated monitoring system 100 is generally shown. A utility system 102 having multiple monitoring devices M provides data from each monitoring device M that is communicated to an automated data alignment system 104 and an automated hierarchy classification system 106. The data is aligned automatically in the automated data alignment system 104 and produces data that is aligned such that it represents the data when it was actually seen simultaneously by the monitoring devices M in the power monitoring system 102. The hierarchy classification system 106 automatically learns the hierarchy of monitoring devices present in the utility system 102 and their positional relationships relative to one another. Examples of the hierarchy classification system 106 and algorithms associated therewith are described in U.S. Pat. No. 7,272,518, titled "Automated Hierarchy Classification in Utility Monitoring Systems," issued Sep. 18, 2007, and in PCT Patent Application No. PCT/US2006/034394, titled "Improvements in Hierarchy Determination for Power Monitoring Systems," filed Nov. 5, 2007 [SPL-0099].

Once the data from each monitoring device M is aligned and each monitoring device's position is determined within the hierarchy, the data is said to be in context 108. The contextual data 108 can be used by software applications 110 to provide and diagnose useful information about the utility system 102 beyond what is generally available if the data is not in context. The utility being monitored in the utility system 102 can be any of the five utilities designated by the acronym, WAGES, or water, air, gas, electricity, or steam. Each monitoring device measures characteristics of the utility, and quantifies these characteristics into data that can be analyzed by a computer. For example, the monitoring device may measure power, energy, volume per minute, volume, temperature, pressure, flow rate, or other characteristics of water, air, gas, electricity, or steam utilities. In the electrical context, the monitoring device may be based on a PowerLogic® Series 3000/4000 Circuit Monitor or a PowerLogic® ION7550/7650 Power and Energy Meter available from Schneider Electric or any other suitable monitoring device such as an intelligent electronic device (IED), a circuit breaker, a relay, a metering device, or a power meter.

A user interacts with the software applications 110 via a conventional user interface 112. The software applications 110 can be linked to other systems 114, such as a billing system, and use the contextual data 108 to communicate messages between the other systems 114 and the user interface 112.

The data alignment system 104 aligns data, such as voltage, current, time, events, and the like, from multiple monitoring devices M in a utility system, and is a valuable tool for users. When data from all the monitoring devices M is aligned to the same point in time that the data occurred, the data can be put into a temporal context from which additional decisions regarding hardware and software configuration can be automatically made or recommended. As used herein, a monitoring device refers to any system element or apparatus with the ability to sample, collect, or measure one or more operational characteristics or parameters of a utility system 102. When the utility system 102 is a power monitoring system, the monitoring device M can be a meter that measures electrical characteristics or parameters of the power monitoring system.

The data alignment system 104 aligns all monitoring devices M in a power utility system hierarchy to the zero-crossing of all three phase voltages without the use of additional hardware, notwithstanding potential phase shifts between various monitoring devices, such as for example, those caused by certain transformer configurations. Once the data of the monitoring devices are aligned with each other, the system data is essentially aligned with respect to the time it occurred, making more complex data analyses feasible.

Generally, the hierarchy classification system 106 utilizes an auto-learned hierarchy algorithm in the monitoring system software that is based on rules and statistical methods. Periodically, the monitoring system software polls each monitoring device in the utility system 102 to determine certain characteristics or parameters of the utility system 102 at that node (represented by monitoring device M). Multiple samples of specified parameters are taken from each meter in the system at the same given point in time. Once the parameter data is collected from each node M in the utility system 102, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the utility system 102 is correct, the auto-learned hierarchy algorithm ends. The final layout of the utility system 102 is then presented to the user for concurrence. As each monitoring device's data is evaluated over time (the learning period) with respect to all other monitoring devices using the auto-learned hierarchy algorithm, a basic layout of the hierarchical structure of the utility system 102 is determined based on the monitoring points available. In this respect, the algorithm uses historical trends of the data from each monitoring device, and those trends are compared to determine whether any interrelationship (link) exists between the monitoring devices. A more detailed hierarchical structure can be determined with more monitoring points available for analysis.

In an embodiment in which the utility system 102 is a power monitoring system, samples of specific electrical parameters (such as power, voltage, current, or the like) are simultaneously taken from each monitoring device in the power monitoring system. This parameter data is stored and analyzed with respect to the time the sample is taken, the associated value of the data point, and the monitoring device providing the data.

Data taken from each monitoring device in the power monitoring system is compared with each other to determine whether any correlation exists between the monitoring devices. The data is analyzed for statistical trends and correlations as well as similarities and differences over a predetermined period of time.

As explained in U.S. Pat. No. 7,272,518, titled "Automated Hierarchy Classification in Utility Monitoring Systems," issued Sep. 18, 2007, the hierarchy algorithm populates a Data Table with raw time-series data indicative of a characteristic of a utility being monitored (e.g., power, voltage magnitude, voltage distortion, current magnitude, current distortion, or symmetrical component data) by the monitoring devices at regular time intervals over a given time period. From the Data Table, the hierarchy algorithm develops a Correlation Coefficient Matrix (CCM) by carrying out a statistical evaluation to determine the linear relationship of each monitoring device in the utility system with respect to the other monitoring devices in the matrix. The higher the correlation coefficient value is, the higher the probability that these two monitoring devices are either directly or indirectly linked. Conversely, the lower this number is, the lower the probability that these two monitoring devices are directly or indirectly linked. The equation below determines the correlation coefficient between any two given monitoring devices:

$$\rho_{x,y} = \frac{Cov(x, y)}{\sigma_x \sigma_y}$$

where: $\rho_{x,y}$ is the correlation coefficient and lies in the range of $-1 \leq \rho_{x,y} \leq 1$,;

Cov (x, y) is the covariance of x and y; and $\sigma_x$ and $\sigma_y$ are the standard deviations of x and y, respectively.

$$Cov(x, y) = \frac{1}{n}\sum_{j=1}^{n}(x_j - \mu_y)(y_j - \mu_y)$$

where: n is the number of data elements in x and y, and $\mu_x$ and $\mu_y$ are the mean values of x and y respectively.

Figure 2:
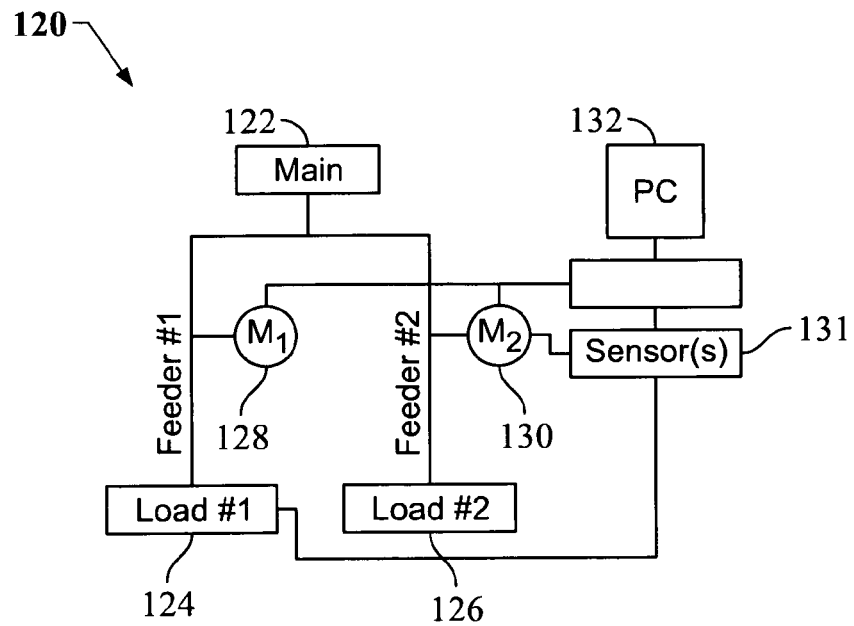
FIG. 2 is a functional block diagram of a simplified power monitoring system that also includes sensors.

A simplified configuration of a power monitoring system 120 is shown in FIG. 2. The power monitoring system 120 includes a main 122 connected to a first load 124 by a first feeder and to a second load 126 by a second feeder. Monitoring devices 128, 130 measure electrical characteristics or parameters associated with the first and second feeders, respectively. Each monitoring device 128, 130 is communicatively coupled to a computer 132. One or more sensors 131 may also be communicatively coupled to the computer 132 and may be coupled to a monitoring device, such as the monitoring device 130, and/or to a load, such as the first load 124. Such sensors 131 will be described below, particularly in connection with FIG. 10.

Figure 3:
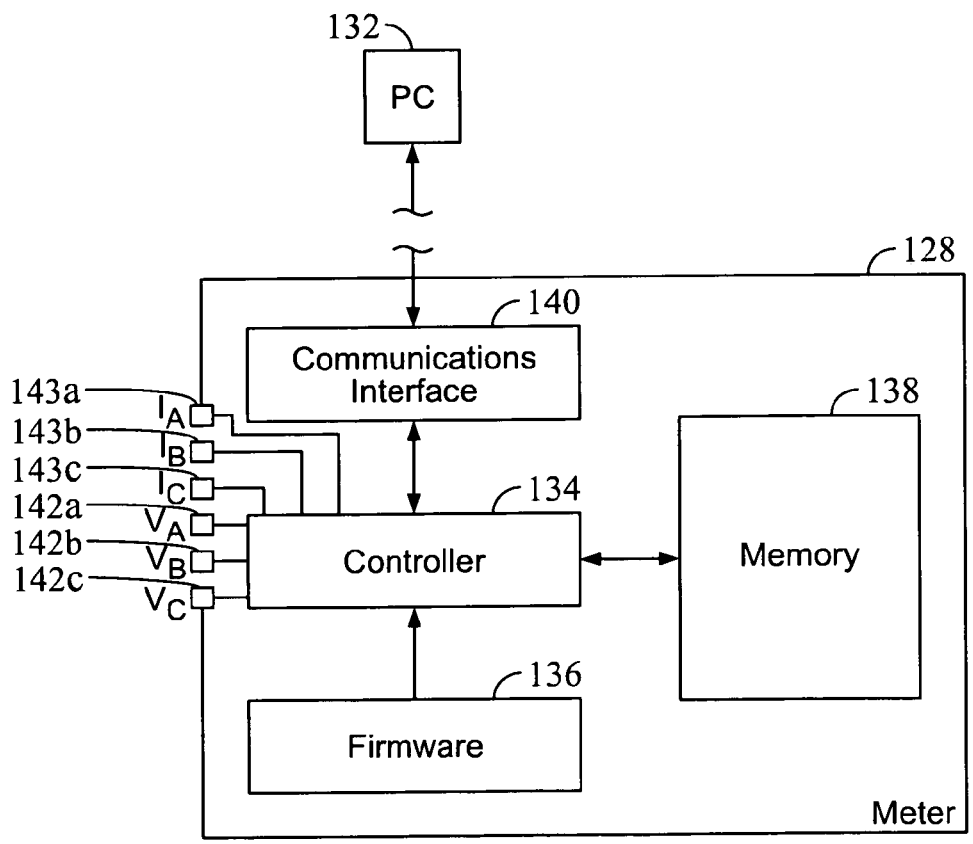
FIG. 3 is a functional block diagram of an exemplary monitoring device.

The first monitoring device 128 can be an electrical monitoring device (or electric meter), such as shown in FIG. 3. The monitoring device 128 includes a controller 134, firmware 136, memory 138, a communications interface 140, and three phase voltage conductor connectors 142a,b,c, which connect to the $V_A$, $V_B$, and $V_C$ phase voltage conductors, respectively, and are coupled to the controller 134. Three phase current conductor connectors 143a,b,c, which connect to the $I_A$, $I_B$, and $I_C$ phase current conductors, respectively, are optionally coupled to the controller 134. The firmware 136 includes machine instructions for directing the controller to carry out operations required for the monitoring device. Memory 138 is used by the controller 134 to store electrical parameter data measured by the monitoring device 128.

Instructions from the computer 132 are received by the monitoring device 128 via the communications interface 140. Those instructions include, according to an embodiment of the present invention, instructions that direct the controller 134 to mark the cycle count, to begin storing electrical parameter data, or to transmit to the monitoring system software 132 electrical parameter data stored in the memory 138. The electrical parameter data can include any data acquired by monitoring devices, including any combination of frequency variations, amplitude variations, and phase variations.

The data integrated monitoring system 100 also includes an aggregation system 105 according to aspects of the present invention, which may receive device data associated with the utility system 102 via manual or automated methods or time-aligned data that has been automatically generated by the automated data alignment system 104. The aggregation system 105 outputs process data and runs a process algorithm 400 according to aspects disclosed herein. The process algorithm includes instructions for aggregating monitoring devices and optionally sensors in a utility system into one or more groups that are related by a common process. Two examples of a process are a heating, ventilating, and air conditioning (HVAC) process and a manufacturing process.

The aggregation system gathers data for the end-user from discrete utility monitoring devices, e.g., 128, 130, virtual monitoring devices, e.g., $VM_1$, $VM_2$ (FIG. 8), and other sensors, e.g., 131, into a "process hierarchy." By aggregating or consolidating monitoring devices and sensors together into a logical group related to a specific process, the end-user is able to more effectively and logically address both reliability and energy-related concerns. A process hierarchy links or groups related system devices and apparatuses (including monitoring devices 128, 130 and sensors 131) and virtual devices (e.g., $VM_1$, $VM_2$) into a logical group and all members of this group are related to one another as being part of a common process. A discrete event or steady-state condition that adversely impacts a lone process component (e.g., 128, 130, 131) also shows the potential influence of that same event on an entire process or system 102. The process hierarchy can provide the end-user with a useful view into the costs and operational conditions of their loads and facility processes. In other words, a process hierarchy can provide a more organized perspective of the total utility monitoring system, one that illuminates how significant an event or steady-state condition is from an operational perspective.

Figure 7:
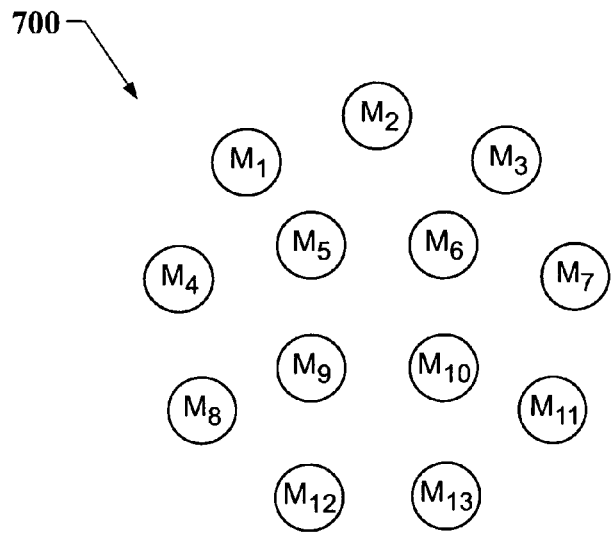
FIG. 7 is an illustration an exemplary group of discrete utility monitoring devices as they may be viewed by existing monitoring software systems.
Figure 8:
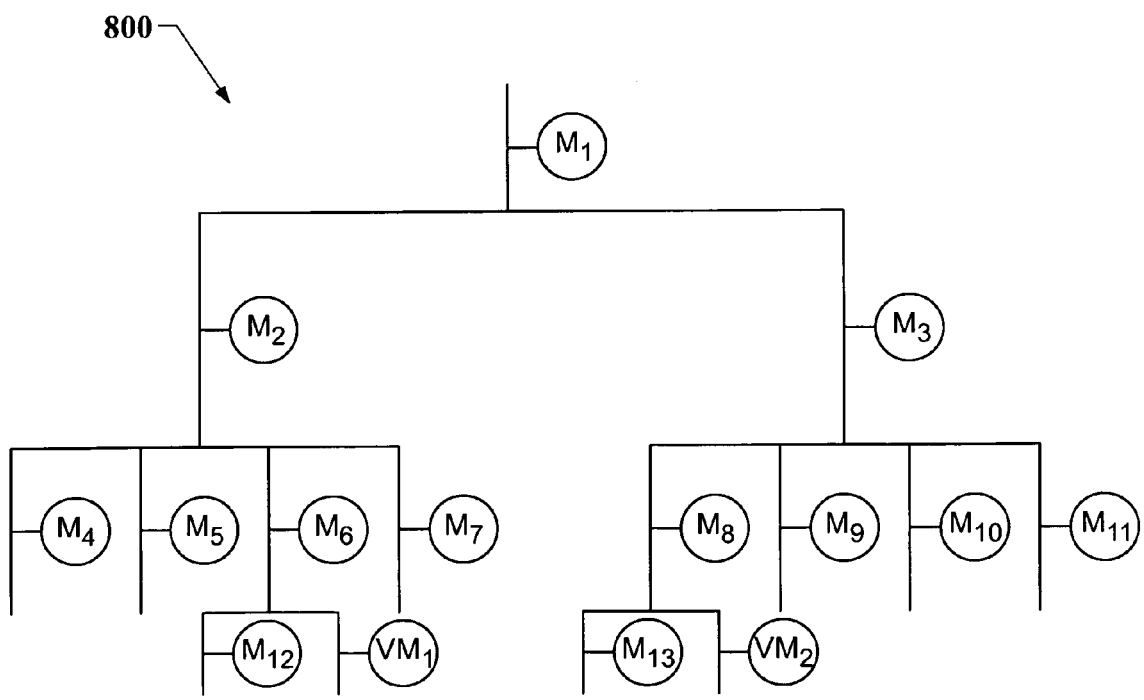
FIG. 8 is a illustration of the same discrete devices shown in FIG. 7 arranged into a monitoring system hierarchy.
Figure 9:
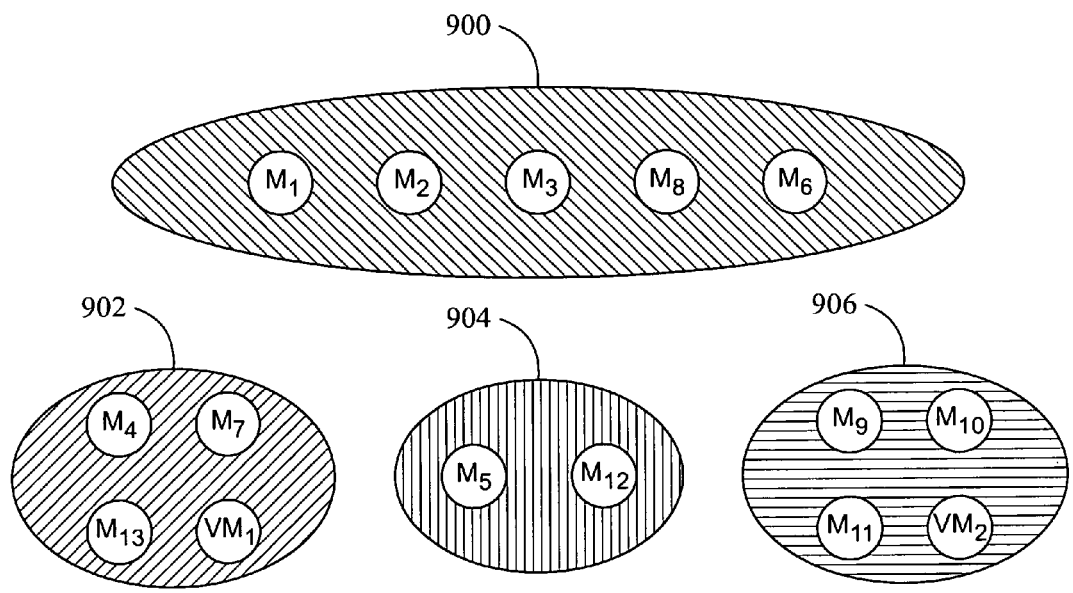
FIG. 9 is an illustration of the discrete devices shown in FIG. 8 arranged into discrete process hierarchies according to aspects disclosed herein.
Figure 11:
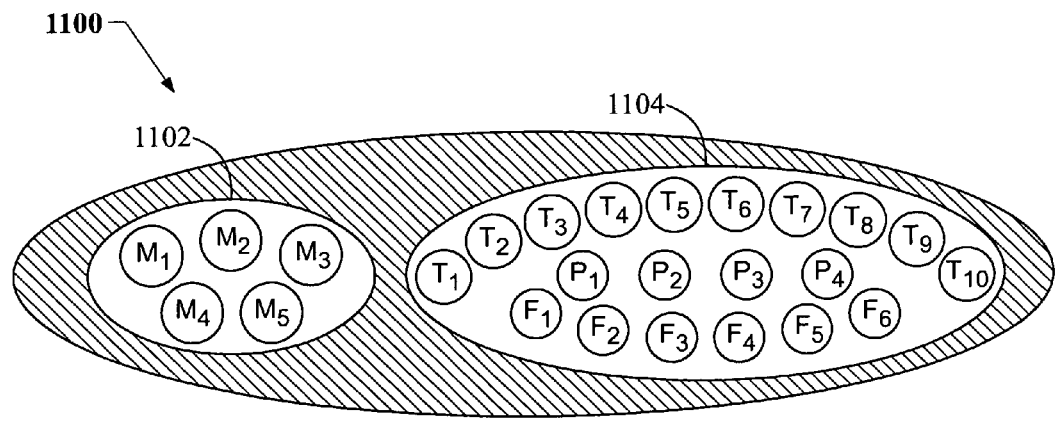
FIG. 11 is an exemplary process hierarchy of the monitoring devices and sensors shown in FIG. 10, grouped according to the process algorithm disclosed in aspects herein.

A process hierarchy differs from the monitoring system hierarchy in that the monitoring system hierarchy relates to how all of the capable monitoring devices are linked to one another in the utility system whereas a process hierarchy relates to how certain monitoring or sensing devices belong to a common process within the monitoring system hierarchy. An exemplary monitoring system hierarchy contrasted with a process hierarchy is shown in FIGS. 8 and 9, respectively. FIG. 7 illustrates a utility system 700 having a number of monitoring devices with no indication as to how they interrelate to one another. The end-user does not know which monitoring devices are linked to one another or their relationship (parent-child, for example) relative to other monitoring devices. Many contemporary monitoring systems require the end-user to manually place these devices into spatial (locational) context. FIG. 8 illustrates a monitoring system 800 that organizes the monitoring devices into their proper location context within the monitoring system's hierarchy. Two virtual monitoring devices, $VM_1$, $VM_2$ are also shown, which may be tracked in software even though no physical monitoring device are installed at those points (hence the term 'virtual'). This hierarchy resembles a one-line diagram with which those of ordinary skill in the art will be familiar. As mentioned repeatedly herein, this hierarchy may be developed automatically or manually. Finally, FIG. 9 shows multiple process hierarchies or groups 902, 904, 906 populated with the monitoring devices shown in FIGS. 7 and 8. These groupings are merely exemplary but intended to point out several aspects. First, a process group may include one or more virtual monitoring devices, such as the process group 902, which includes $VM_1$, and the process group 906, which includes $VM_2$. Second, there may be multiple processes running within a utility system, and in this example there are three processes. Third, a process group may contain two or more monitoring devices (physical or virtual) and/or optional sensors as shown in FIG. 11. Finally, there may be monitoring devices that are not associated with any process, such as the process group 900. Such monitoring devices may not have correlated highly enough with any other monitoring device, may be identified by the end-user as not associated with a process, may be a parent monitoring device that does not directly monitor any load, or cannot be evaluated by the automated process algorithm because they are not connected to a load.

At least three principal approaches to ascertaining a process hierarchy are disclosed herein: an automatic approach in which the process hierarchy is determined automatically, a manual approach in which the process hierarchy is developed manually, or a hybrid approach in which the process hierarchy is determined by a combination of the automatic and manual approaches.

In the automatic approach, a process algorithm 400 disclosed herein automatically determines which monitoring devices in a utility monitoring system appear to belong in a particular process hierarchy or group. The automatic approach assumes that the hierarchy of the utility monitoring system has already been determined, either manually or automatically as disclosed in U.S. Pat. No. 7,272,518, titled "Automated Hierarchy Classification in Utility Monitoring Systems," issued Sep. 18, 2007. When the monitoring system hierarchy has been determined automatically, the aggregation system 105 receives location (spatial) data from the hierarchy classification system 106 or any other parameters that may be passed from the hierarchy classification system 106. Otherwise, the aggregation system 105 may receive device data from the utility system 102. A statistical evaluation is carried out on specific utility data from each capable discrete monitoring device or sensor across the utility monitoring system hierarchy to determine the strength of their interrelationships and whether any two devices are operationally linked by a common process. Monitoring device pairs that exhibit a significant enough correlation would then be assigned to a specific process with each other. The end-user may validate the results of the automated aggregation algorithm to ensure their accuracy. Supplemental evaluations can be performed for process placement of any utility devices or sensors 128, 130, 131 added or moved within the monitoring system. The aggregation system 105 includes analysis and alarming features that will be described in more detail below.

In the second approach (manual), each utility monitoring device is assigned to a given group by the end-user, where the devices in a specific group are process-related. This task may be performed either remotely from a computer or at the utility monitoring device's display. Once configured by the end-user, the process algorithm 400 may automatically validate the end-user's configuration for accuracy using historical data taken from the utility monitoring devices and sensors.

The third hybrid approach (both automatic and manual) is a special case that can provide a more powerful tool for the end-user. The process algorithm 400 provides everything described in the first approach above; however, I/O (input/output) data from the sensors 131 is also integrated into the analysis and alarming features. Beyond the parameters measured by typical utility monitoring devices, I/O points (via the sensors 131) may provide almost any other type of analog or digital information about the process or system including temperature, pressure, flow rates, status (on/off or high/low), voltage, time signals, and so forth. In effect, a "third dimension" is added to analyzing a process's operational characteristics.

Another advantage to the hybrid approach is that the end-user can link or unlink devices and processes from each other in order to develop super-processes or sub-processes. For example, the process algorithm 400 may determine that ten devices are process-related; however, the end-user may wish to break these ten devices into two separate processes for some specific purpose. For example, the end-user may be interested in the cooling tower sub-process of the cooling system process. Conversely, the process algorithm 400 may determine two processes exist; however, the end-user wishes to interlink these processes with each other. For example, the end-user may want to combine their cooling system process with their heating system process to develop a HVAC super-process. While the process algorithm 400 is capable of automatically determining process-related devices from a group of discrete devices, the end-user may aggregate (by adding devices to a group) or disaggregate devices (by removing devices from a group) per their specific requirements. The end-user may also interlink specific processes (and their respective device groups) accordingly.

The devices (e.g., monitoring devices and/or sensors) grouped into a specific process would be viewed as their own process hierarchy in the user interface, and could also be indicated as "process-related" in other hierarchies (e.g., the power monitoring system hierarchy, billing hierarchies, etc.). Once a subset of discrete devices are grouped into a specific process hierarchy, their alarms can be aggregated into a single process alarm. Process alarms can be analyzed based on the potential impact of the event or steady-state condition to the entire process or facility's operation. Historical data can be used by the software 110 to identify and track issues (e.g., reliability, energy usage, flow rates, pressure anomalies, etc.) and to suggest potential issues and solutions. Integrating data from I/O points into the process analysis can facilitate "just-in-time" maintenance or provide additional insights into the source of efficiency issues within the process.

In short, aspects herein provide a logical and automated aggregation of alarms that is beneficial to end-users. The aggregation of discrete utility monitoring devices and optionally sensors into discrete processes reduces the inundation of data typically experienced by end-users while simultaneously providing end-users with an encompassing view of their utility system. Aspects herein will provide end-users with the status of their system from an operational vantage rather than in meticulous detail.

Prior to aggregating or grouping together any two process-related devices, the utility monitoring system's hierarchy must first be determined, either automatically (as described in U.S. Pat. No. 7,272,518, titled "Automated Hierarchy Classification in Utility Monitoring Systems," issued Sep. 18, 2007, and PCT Patent Application No. PCT/US2006/034394, titled "Improvements in Hierarchy Determination for Power Monitoring Systems," filed Nov. 5, 2007 [SPL-0099]) or manually. If the monitoring system hierarchy was established automatically, both data table (typically with time-series power data) and correlation coefficient matrix (CCM), discussed above, will have already been developed. If the monitoring system was established manually, a data table will have to be built for all devices to be analyzed and a CCM will have to be determined from the data table as described in U.S. Pat. No. 7,272,518, titled "Automated Hierarchy Classification in Utility Monitoring Systems," issued Sep. 18, 2007, or PCT Patent Application No. PCT/US2006/034394, titled "Improvements in Hierarchy Determination for Power Monitoring Systems," filed Nov. 5, 2007. In either case, a CCM will be required in some aspects to determine which devices are related to a common process.

In a power monitoring system, preferably, but not exclusively, the CCM data is populated based on the power monitored by the monitoring devices when they are power monitoring devices. In a utility water system, preferably, but not exclusively, the CCM data is populated based on the flow rate by the monitoring devices when they are flow rate devices.

Once the CCM is determined, there are at least two approaches to ascertain process-related devices. The first relies on a fixed threshold for a minimum correlation coefficient, which may be set manually by the end-user (504). If two devices that do not have direct or indirect links in the utility monitoring system hierarchy have a correlation coefficient greater than some fixed value between 0 and 1 (0% and 100%), then these devices are considered to be process-related. The fixed threshold value may be arbitrarily set by the end-user (e.g., 0.5 for at least a correlation of 50%) or by a default value provided by the manufacturer.

Figure 5:
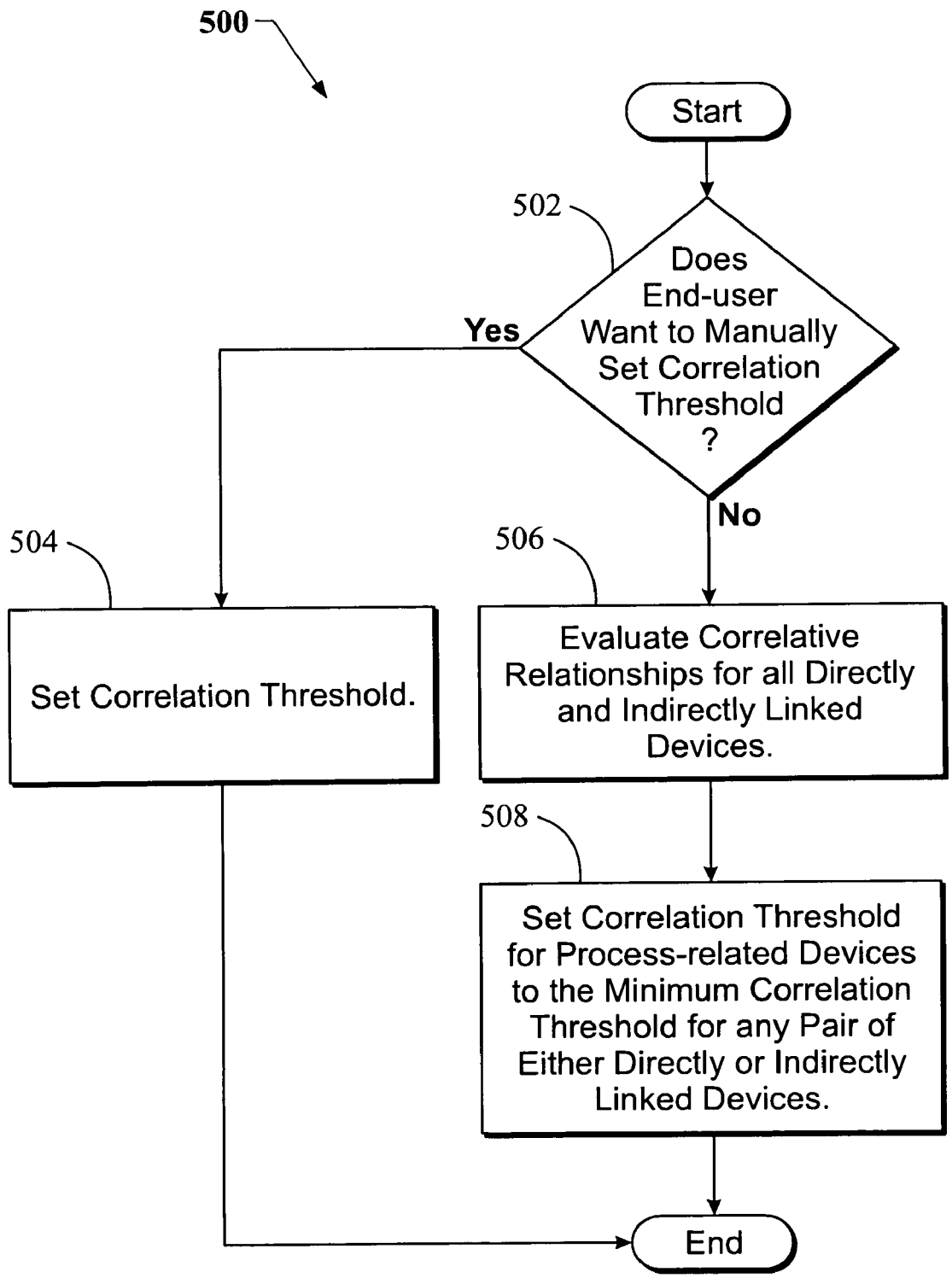
FIG. 5 is a flow diagram of a method of setting a correlation threshold according to aspects disclosed herein.

The second relies on the use of correlative relationships of devices known to be directly or indirectly linked within the utility monitoring system hierarchy to establish the threshold for process relationships (500). For example, the minimum (508); average, or maximum correlation coefficient for all devices known to be directly or indirectly related can be chosen as a correlation threshold. This approach addresses the uniqueness of each end-user's particular utility system, which may either have generally low or high correlative relationships overall. An exemplary threshold setting algorithm 500 that follows this second approach is shown in FIG. 5, discussed in more detail below.

In both approaches, raw correlation coefficients are taken from the time-series data table (power, energy, etc.) without any post-processing (e.g., subtracting and reestablishing iterated correlation coefficients).

Grouping Virtual Monitoring Devices Into a Process Containing Physical Monitoring Devices The aggregation system 105 can group virtual monitoring devices in addition to (physical) monitoring devices into one or more processes as well. Once the monitoring system's hierarchy is known, it is a straightforward matter to determine the time-series data for each virtual monitor in the utility monitoring system by finding the difference in the time-series data between each parent monitoring device and the total of its children. Referring to FIG. 8 by way of example, the time-series data for $VM_1$ is equal to the difference between the point-by-point time-series data for $M_6$ and for $M_{12}$ (i.e., $VM_1 = M_6 - M_{12}$).

Once the time-series data is developed for $VM_1$, that virtual monitoring device ($VM_1$) may be treated essentially the same as any physical monitoring device (e.g., $M_6$, $M_{12}$, etc.). Thus, correlation coefficients may be found between two virtual monitoring devices (e.g., $VM_1$ and $VM_2$ in FIG. 8) or between virtual monitoring devices and physical monitoring devices (e.g., $VM_1$ and $M_{12}$ in FIG. 8). Once correlation coefficients are found for virtual monitoring devices, the process algorithm 400 operates as discussed above.

It should be noted that virtual monitoring devices may be monitoring multiple loads, so the correlations coefficients may be attenuated and the process relationships may be tempered. The loads being scrutinized by the virtual monitoring device will likely have different load characteristics (some more and some less), so it is recommended that the end-user provide a validation for any determined process relationship between virtual monitoring devices and physical monitoring devices. This is highly recommended for relationships that are established between two virtual monitoring devices.

Process Algorithm Examples

Figure 4A:
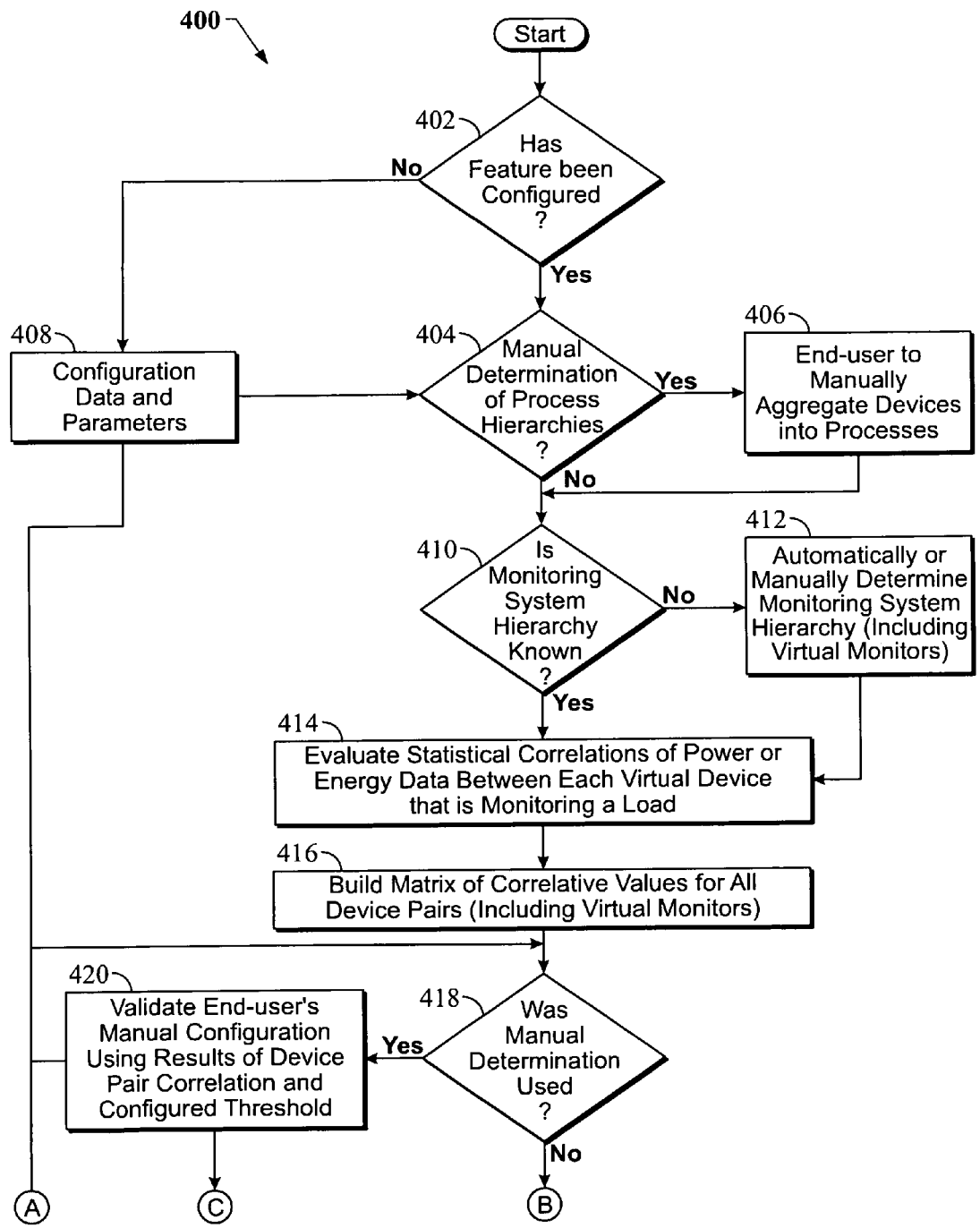
FIG. 4 is a flow diagram of an exemplary process algorithm according to aspects disclosed herein.
Figure 4B:
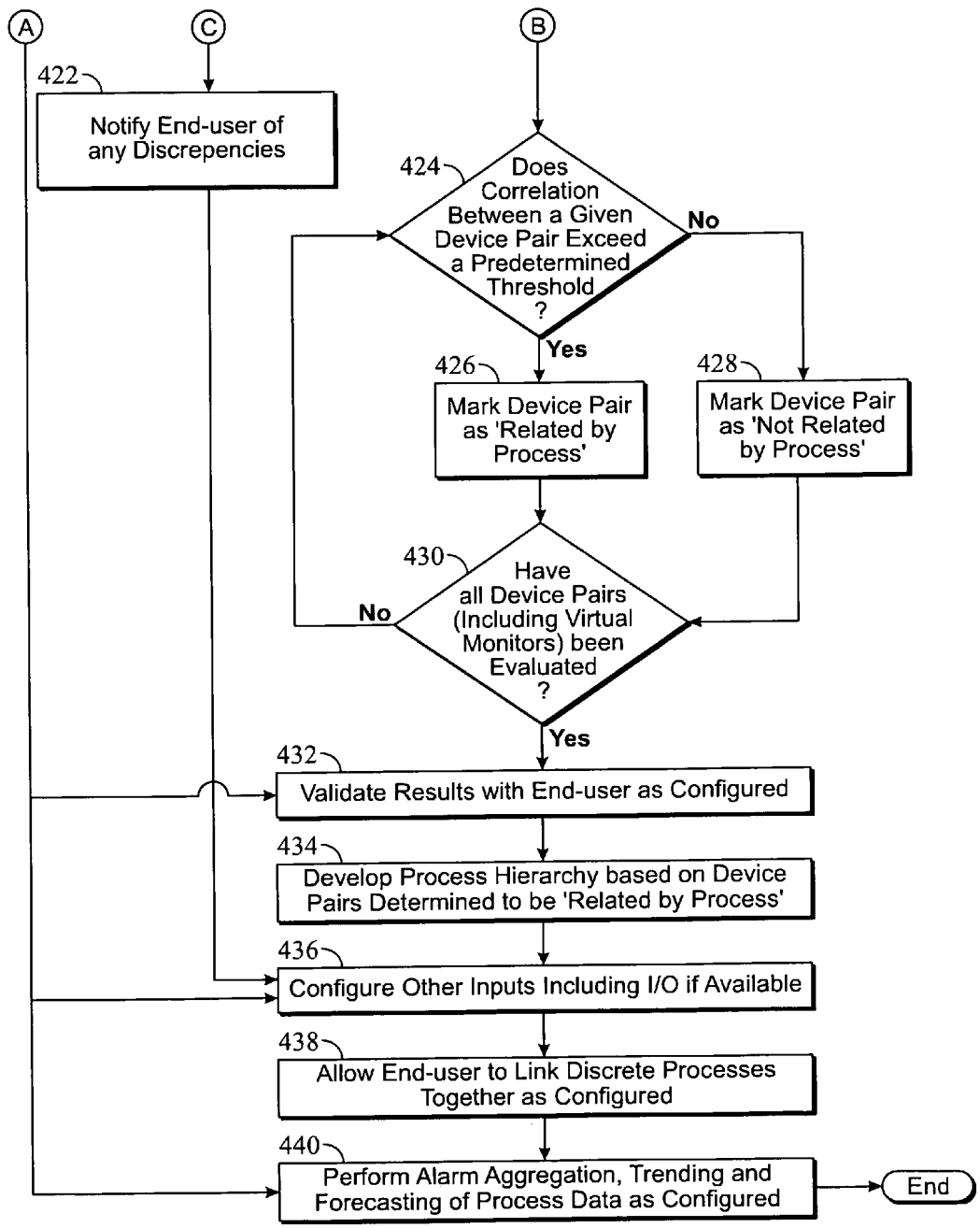
Figure 6:
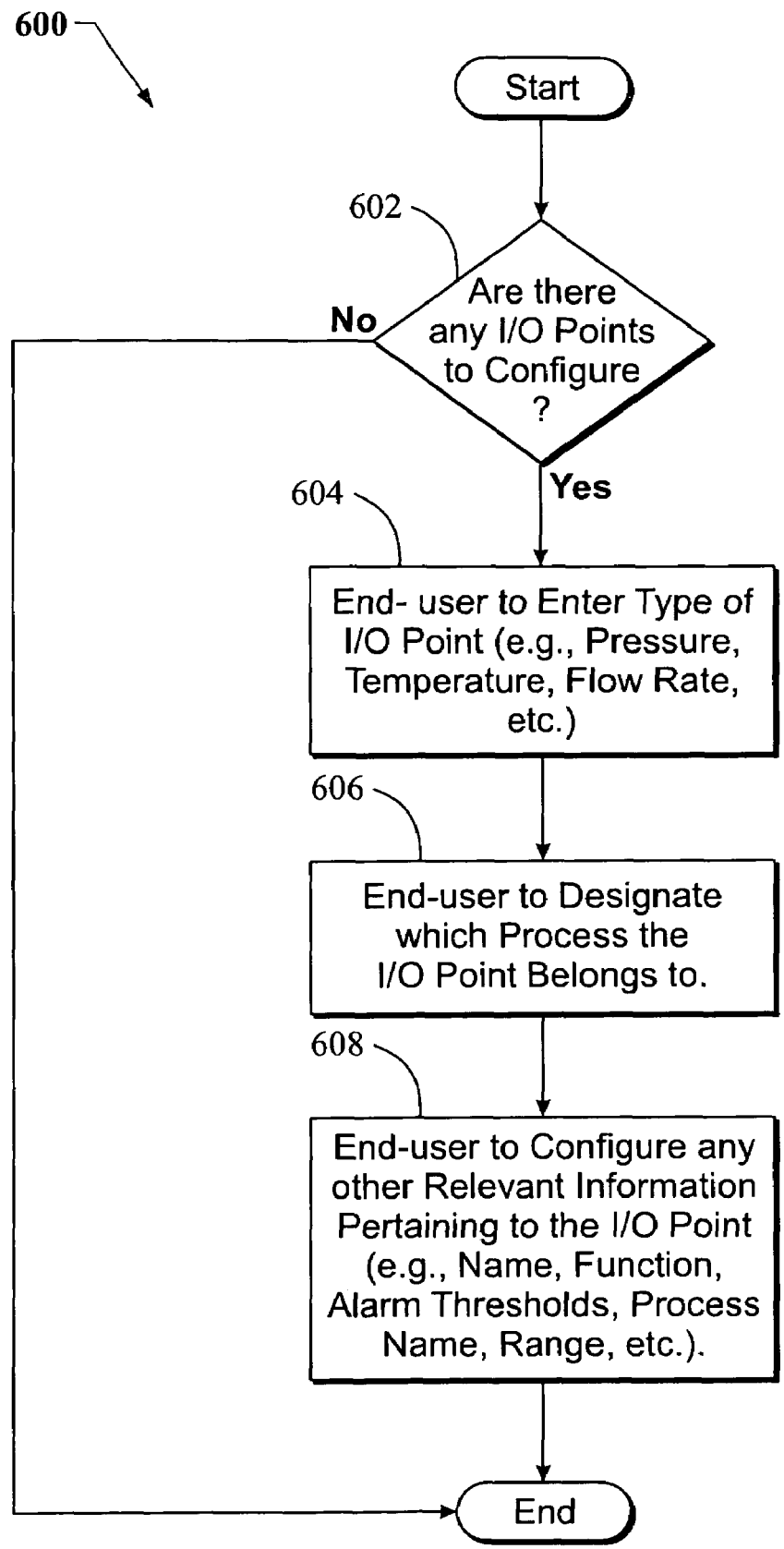
FIG. 6 is a flow diagram of a method of configuring I/O points according to aspects disclosed herein.

FIGS. 4-6 are flow diagrams of components of exemplary process algorithms according to aspects disclosed herein. These algorithms may be run on the computer 132 and may be part of the aggregation system 105. The blocks shown in these figures need not be carried out in the order depicted nor must all of the blocks necessarily be carried out in all aspects. The process algorithm 400 determines whether the feature for aggregating monitoring devices into commonly related processes has been configured (402). An end-user may disable this feature or may enable only certain parameters relating to this feature (408). If the end-user has not disabled this feature and it has not yet been configured, the algorithm receives configuration data and parameters (408), which may include information such as whether to automatically or manually determine the monitoring system hierarchy, how the correlation threshold is to be determined, how the display output is to be configured, and the like.

Once configured, the process algorithm 400 determines whether the process hierarchies are to be determined manually (404). If so, the algorithm 460 supplies an end-user interface for the end-user to manually aggregate monitoring devices into one or more process groups (406). For manual entry, the end-user simply selects which monitoring devices are related to a common process and groups them into one process. The end-user may label or name the process (e.g., "HVAC process") to differentiate it from others that the end-user may create and populate with other monitoring device groupings.

The process algorithm 400 determines whether the monitoring system hierarchy is known (410). In some aspects, the process algorithm 400 may have already been passed information indicative of the monitoring system hierarchy, such as from block 408. If the monitoring system hierarchy is not known, it is determined automatically or manually (412). The monitoring system hierarchy may include virtual monitoring devices to indicate a virtual monitoring point in the hierarchy that lacks a physical monitoring device.

The process algorithm 400 evaluates the statistical correlations of power or energy data (in the case of a power monitoring system) or flow rate or volume data (in the case of other utility systems) between each (virtual) monitoring device that is monitoring an apparatus or apparatuses that are consuming a WAGES utility (hereinafter referred to as a utility load) (414). Referring to FIG. 8, monitoring devices $M_1$, $M_2$, $M_3$, $M_6$, and $M_8$, for example, are not directly monitoring a utility load, so these devices would not be evaluated. They are grouped in the group 900, which contains monitoring devices not directly relatable to any particular process, and removed from further evaluation by the process algorithm 400. With respect to the remaining monitoring devices that are connected to a load, the process algorithm 400 builds a matrix of correlation values for all combinations of monitoring device pairs including virtual monitoring devices (416).

If the process groups were determined manually in block 406 (418), the process algorithm 400 may validate the end-user's manual configuration of the process groups using the device pair correlations in the matrix (416) and the configured correlation threshold (420). Any discrepancies may be reported to the end-user (422). To validate the manual formation of process groups, the process algorithm 400 determines whether correlation coefficients calculated from device data measured by the monitoring device pairs in a given process group exceed a predetermined correlation threshold. If a device pair in the process group is associated with a correlation value that does not exceed the correlation threshold, these devices may be flagged as potentially unrelated to the process group, and the end-user may decide whether to disaggregate this device pair or leave it within the process group.

If process groups have not been determined manually, the process algorithm 400 determines whether a correlation coefficient associated with a monitoring device pair exceeds a predetermined threshold (424). The correlation coefficient is calculated from device data measured by the monitoring device pair. It is important to note that when building the monitoring device hierarchy, correlation coefficients are calculated with respect to a capable reference monitoring device and every other capable monitoring device in the monitoring system. Device pairs are said to be linked together in the hierarchy when they have the highest correlation coefficient relative to all other combinations of device pairings in the monitoring system. Once a linked device pair is located, they are removed from the matrix and the correlation routine is iterated again using the next reference device to find its linked neighbor. By contrast, in determining process hierarchies herein, devices that are not linked together in the hierarchy may still be identified as related to a single process. For example, in FIG. 9, the first process group 902 includes monitoring devices $M_4$ and $M_{13}$, which are not linked either directly or indirectly to one another (see FIG. 8). They would not have been identified as a linked device pair in the hierarchy classification system 106, but in this example have been determined to be related to the same process by virtue of a pronounced correlation of their respective monitored data.

If the correlation coefficient between a given device pair exceeds a predetermined threshold, the device pair is marked as related by process (426) and they are grouped together. For example, a representation of a group including this device pair is stored in memory along with an identification of the process, which may not be known to the process algorithm 400 in which case the process algorithm 400 simply may assign an iterative label to each newly determined process. A graphical representation of several groups 902, 904, 906 is shown in FIG. 9. Otherwise, the device pair may be marked as being not related by process (428) so that the process algorithm 400 may track which device pairs have already been analyzed.

This assessment of device pair correlations against a predetermined threshold is iterated until all potentially process-related device pairs (including virtual monitoring devices) have been evaluated (430). Once all potentially process-related device pairs have been evaluated the process algorithm 432 may validate the results with the end-user as configured. For example, if the hierarchy was manually determined, but the process algorithm 400 determines that monitoring device $M_3$ shown in FIG. 8 is related by process, during validation, the end-user may realize that there is an error in the position of monitoring device $M_3$ in the monitoring system hierarchy or in the misidentification of monitoring device $M_3$ as being directly connected to a load (when in fact it is not). This validation stage allows the end-user to correct for errors that might be caused during manual entry of inputs required for the process algorithm 400.

For those devices determined to be related by process, the process algorithm 400 develops one or more process hierarchies (e.g., groups), such as the graphical representations of the process groups 902, 904, 906 shown in FIG. 9. Up to this point, the process algorithm 400 has grouped monitoring devices and optionally virtual monitoring devices that are connected to loads into one or more process groups. As mentioned above, in addition to monitoring devices, other devices such as sensors and other I/O devices may also be grouped into process groups containing monitoring devices. The process algorithm 400 configures other inputs including I/O if available (436). This configuration includes allowing the end-user to group sensors and other I/O devices into one or more process groups determined by the process algorithm 400. Many I/O devices are invariably related to processes in the utility system and to the extent these I/O devices can communicate their sensor data, that sensor data can be monitored for anomalies along with the data from the monitoring devices. One such configuration process 600 is shown in FIG. 6, described more fully below.

The process algorithm 400, having one or more process groups populated with various monitoring devices, including virtual devices, and I/O devices such as sensors, performs alarm aggregation and trending and forecasting of data as configured (440). Alarm aggregation is particularly useful because now when multiple monitoring devices and sensors indicate an anomaly and numerous alarms are received by the process algorithm 400, the process algorithm 400 aggregates all of those alarms into a single alarm. Instead of reporting numerous individual alarms to the end-user, only one alarm is reported along with the process associated with that single alarm. The anomaly or event may effect multiple devices simultaneously, which will cause multiple alarms to be generated indicating the same event. Heretofore, this inundation of alarm data could be confusing to the end-user and obfuscate the true source of the event or significantly hamper and delay the end-user's revelation of the source of the event. The process algorithm 400 may store indications that alarms indicated by monitoring devices or other devices within a process group that those alarms are associated with the process group such that when any device in that group indicates an alarm, even if others also indicate an alarm, a single "process" alarm is indicated to the end-user who, if so desired, may request additional detail on all of the devices that are reporting an alarm. In other words, the process algorithm 400 allows the end-user to quickly determine, upon receiving an alarm, that the alarm is related to the HVAC process rather than that an alarm is being reported by monitoring device $M_4$. In addition, trending and forecasting is more useful when performed at a process level. For example, the end-user may wish to determine the WAGES consumption across a process to determine a consolidated utility usage of the said process. When all of the devices relating to that process are grouped together, their data can also be analyzed together for trending and forecasting purposes. Other applications of process monitoring are discussed below.

FIG. 5 is a flow diagram of an exemplary threshold setting algorithm 500 that may determine the correlation threshold used in blocks 420 or 424 or set by the end-user in block 408. This threshold setting algorithm 500 may be a subroutine called by the process algorithm 400 in blocks 420 or 424. If the end-user wants to manually set a correlation threshold (502), a correlation threshold is set (504) upon receiving end-user input in this regard. Otherwise, the threshold setting algorithm 500 evaluates the correlation relationships for all directly and indirectly linked monitoring devices 506, including those not connected to loads. In FIG. 8, for example, all monitoring devices $M_1$-$M_{13}$ would be candidates for evaluation. But it is important to note that the only device pairs that are evaluated are those that are linked directly or indirectly. For example, device pair $M_{23}$ would not be evaluated because these devices are not directly or indirect linked. The threshold setting algorithm 500 sets the correlation threshold to be equal to the minimum (lowest) correlation coefficient of all directly or indirectly device pairs in the monitoring system hierarchy (508).

FIG. 6 is a flow diagram of an exemplary I/O configuration algorithm 600 that allows the end-user to add I/O devices and/or transducers to any process group determined by the process algorithm 400. The I/O configuration algorithm 600 may be a subroutine called by the process algorithm 400 in block 436 or in block 408. The I/O configuration algorithm 600 determines whether there are any I/O points (devices) to configure (602). If so, the end-user may enter the type of I/O data (e.g., pressure, temperature, flow rate, etc.) or the I/O data may be automatically accumulated by the I/O device (604). The end-user designates which process the I/O point belongs to (606) and the I/O configuration algorithm 600 groups that I/O device with the other monitoring devices present in that process group. The end-user may configure any other relevant information pertaining to the I/O device, such as name, function, alarm thresholds (alarm when temperature exceeds 75° F.), process name, range, etc. An example of how an end-user may group I/O devices into a process group is discussed below in connection with FIGS. 10 and 11 along with various exemplary applications of process monitoring.

Applications of Process Monitoring

Today's monitoring devices accumulate and provide data to the end-user at a discrete level with each device acting on its own, and only aware and concerned with the phenomena occurring at its terminals. The end-user is required to understand the relevance of data from each discrete utility monitoring device. Because many end-user's facilities are made up of multiple processes (e.g., heating, cooling, computerized sensitive loads, other various manufacturing processes, etc.), it can be difficult to ascertain the relevance of a voltage sag alarm much less an increase/decrease in a load, change in voltage unbalance, periodic transient overvoltage events, etc. from a specific device. While the elemental information provided by many existing utility monitoring systems may be somewhat useful, the end-user's primary concern is at the process level (e.g., "What does a parameter deviation or fluctuation in my utility system mean and how does it affect my facility?").

Process monitoring allows a logical overview and status of each determined process. Data from each group of process-related devices is compiled together and analyzed from a process perspective. The types of analyses that may be performed is only limited by the range of different processes used by utility/WAGES consumers. For example, the energy consumed by a process could be tracked and analyzed in order to evaluate changes in said process's performance and notify the end-user accordingly. If the overall energy required to facilitate the process increases, it would be a simple matter to determine which discrete component(s) are negatively affecting the process's performance, assuming the process's primary components are being monitored. A statistical evaluation of historical data from a select process may also be periodically performed to detect trends towards reduced efficiency. The trending of discrete data such as component energy usage, temperature changes, pressure variances, flow rates, duty cycles, and so forth from each of the process's monitoring devices can be used to ascertain the root cause of a process's diminishing performance.

As mentioned above, aggregation of alarms is another useful feature provided by aspects disclosed herein. Rather than obtaining a myriad of alarms from each discrete device or input operating within the process, the end-user can be notified by a single alarm with all pertinent information from the monitored components of the process compiled into the alarm data. This would allow the end-user to quickly determine how the entire process was affected by the alarm.

Process alarming is also another useful application. A process alarm may involve monitoring the overall efficiency of the process or particular events or trends at some individual process apparatus/component within the process, and when the efficiency or trend becomes adversely affected, the process alarm reports as a single alarm. The end-user may enter each type of process (e.g., cooling, semiconductor wafer fabrication, extrusion, etc.) and have a lookup library in the software that interrelates with the real time data to provide a deeper level of information. Trending and notifying the end-user of changes in the overall process would be highly useful because each process is unique in itself, even across different facilities. Discrete alarms may also be configured based on the type of process or components used within a process.

HVAC Example

Nearly all utility consumers (residential and industrial) employ processes to some degree. These processes may use any combination of water, air, gas, electricity and steam (WAGES) as the causal force to carry out some purpose(s). A simple example is the use of HVAC (heating, ventilating, and air conditioning) to control the climate (temperature and humidity) of enclosed areas such as a home or large office building. The process of heating, ventilating, and air conditioning is just that—a process—and may incorporate (to some degree) any of the WAGES utilities (some more prevalently and traditionally than others). An HVAC system requires the interaction of a variety of components (including mechanical and electrical apparatuses) to successfully fulfill its purpose. The misoperation of any component within an HVAC system may lead to reduced efficiency at best and catastrophic failure at worst; therefore, each component has an important role in the HVAC process. For ease of discussion, this example will focus specifically on the subject of air conditioning. It should be readily understood that the concepts described herein may be applied to any other type of process.

Figure 10:
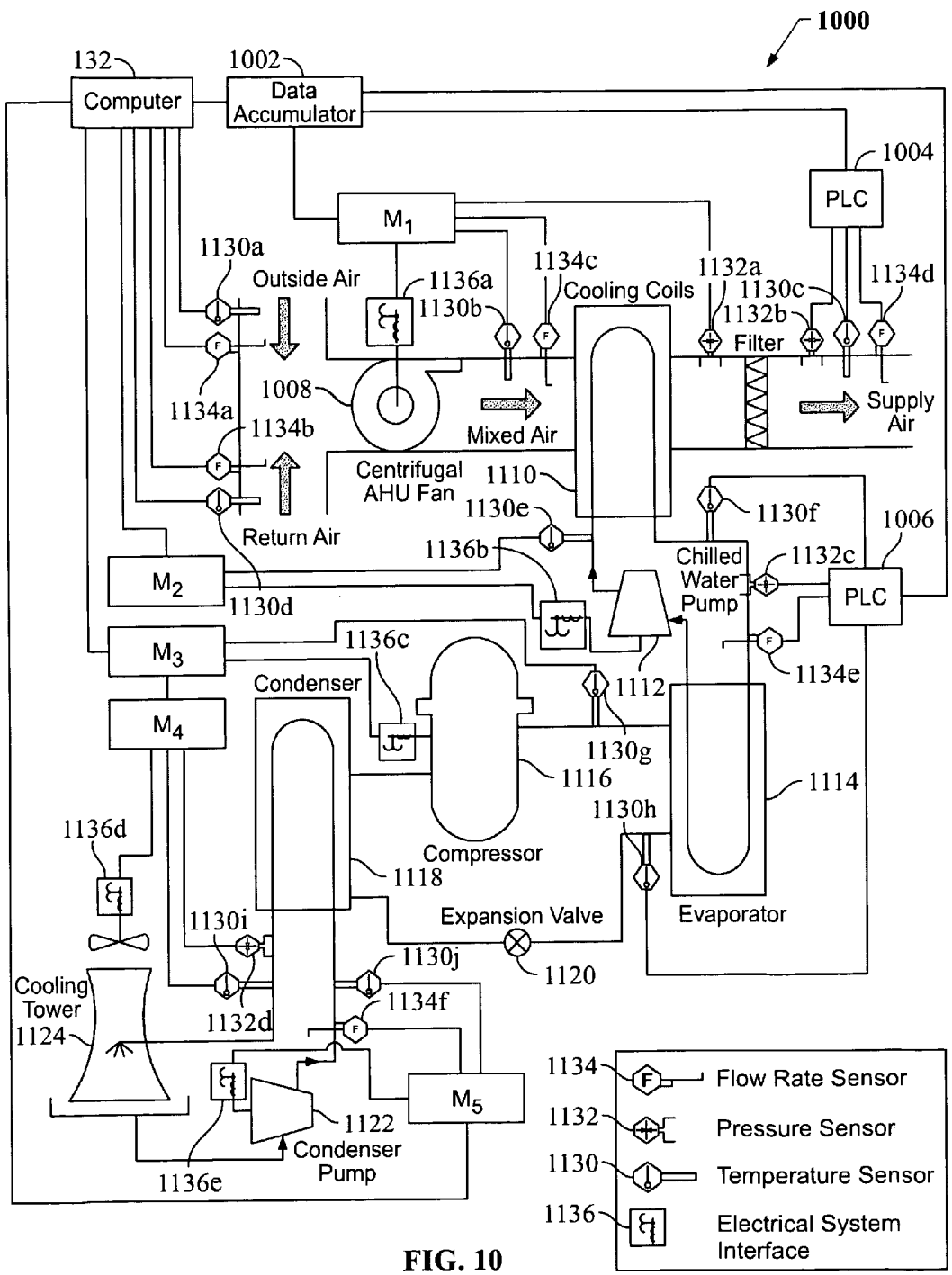
FIG. 10 is a functional block diagram of an exemplary chiller system with cooling tower and monitoring system according to aspects disclosed herein.

FIG. 10 illustrates a basic cooling system 1000 (using vapor compression), which will be discussed in more detail as a non-limiting example. In this example, many different components are required to meet the cooling needs of an end-user. These components include a centrifugal AHU (air handling unit) 1008, cooling coils 1110, a chilled-water pump 1112, an evaporator 1114, a compressor 1116, a condenser 1118, an expansion valve 1120, a condenser pump 1122, and a cooling tower 1124. The cooling system 1000 also includes various monitoring devices, designated as $M_1$-$M_5$, and these are attached to various power-consuming loads and communicate their monitored data to the computer 132. In this example, numerous sensors are also strategically placed throughout the cooling system 1000 to monitor flow rate, pressure, and temperature. Temperature sensors 1130a-j are referred to as $T_1$-$T_{10}$, respectively. Pressure sensors 1132a-d are referred to herein as $P_1$-$P_4$, respectively. Finally, flow rate sensors 1134a-f are referred to herein as $F_1$-$F_6$, respectively. The computer 132 may optionally be coupled to a data accumulator 1002, which may in turn be optionally coupled to monitoring devices, such as M1, and one or more Programmable Logic Controls (PLCs) 1004, 1006. The PLCs 1004 and 1006 may receive sensor data from various sensors in the cooling system 1000 and format and communicate such sensor data to the data accumulator 1002, or the computer 132 may read the sensors, such as temperature sensors 1130a-d and flow rate sensors 1134a,b, or the monitoring devices $M_1$-$M_5$ may receive sensor data from the sensors 1130, 1132, 1134.

Five separate loops exist: a conditioned air loop, a refrigeration loop, a chilled-water loop, a condenser loop, and an evaporation loop. The refrigeration loop typically employs a gas (Freon, etc.), the chilled-water and condenser loops may employ water or some other medium, the conditioned air loop employs air, and the evaporation loop employs air to remove the heat from the process.

In the conditioned air loop, a mixture of air from both within the facility (return air) and outside of the facility (outside air) is drawn into the AHUs and passed across the cooling coils. Subsequently, the air is cooled (i.e., the air temperature is decreased) and ready to supply to the facility. Some of the conditioned air is then circulated back into the return air intake to be mixed with outside air and cooled again for redistribution.

The refrigeration loop uses four basic operations to accomplish its objective: 1) compression, 2) condensing, 3) expansion, and 4) evaporation. An apparatus (generally an electric motor) drives a compressor, which increases the pressure and temperature of the gas. The high pressure gas is passed across the condenser coils where heat is removed and the gas condenses into a liquid (still at a high pressure). The liquid refrigerant is then passed through an expansion valve where the liquid is at both a low temperature and a low pressure. The low temperature/low pressure liquid refrigerant is now passed into the evaporator, which is surrounded by the cooling medium (in this case water). In the process of absorbing and removing heat from the cooling medium, the refrigerant expands back into a gaseous state at low pressure and temperature. The cycle then repeats itself as the gas is routed back into the compressor.

The cooling medium, in this example, is the chilled-water loop. In this example, the water is passed through a shell and tube evaporator where its temperature is reduced by the refrigerant via basic thermodynamic principles. The chilled-water is then pumped to different cooling coils located throughout the facility. Air handling units (AHUs) force air across these cooling coils, thus reducing the air temperature while simultaneously increasing the water temperature. The warmer water then returns to the evaporator to be chilled again, and the cycle repeats itself.

In the condenser loop, water is pumped from the cooling tower via the condenser pump to the condenser. Heat from the refrigeration loop is then transferred to the condenser water, which then flows back to the cooling tower.

Waste heat from the system (via the condenser water) is passed into the atmosphere through evaporation and/or air cooling in the evaporation loop. In short, the cooling tower is the final point in the system where the heat from the facility is released.

It should be apparent that even in this simple process example that there are many components that could render the cooling process inoperative. Each component, whether mechanical and electrical, plays an integral part in the proper functioning of the cooling system. Subtle changes in the cooling system motors' voltage parameters may affect the overall efficiency of the system. Dirty air filters reduce the overall efficiency of the system by developing a high pressure differentials across the filters, and thus, requiring the system to work harder. Scale build-up in the heat exchangers decreases efficiency by reducing the flow of fluids, and thus, reducing the heat transfer characteristics within the system. A fully deployed implementation of this invention provides the end-user with information on how each of these problems (and many more) is (or could be) affecting this specific process and ultimately the facility's operation. Rather than searching through reams of data (the needle in the haystack approach), weaknesses in the process could be quickly identified and resolved while minimizing unscheduled downtime. The ability for a facility manager to provide "just-in-time" maintenance is enhanced.

In this example, integrating all of the monitoring devices $M_1$-$M_5$ into a single "cooling process hierarchy" can provide the end-user with a "big picture" view of the cooling system 1000. Because a problem or anomaly reported by one component may have repercussions across the entire system, a monitoring system with a process vantage can notify the end-user what is actually at stake when one component is operating outside its required parameters. For example, if an AHU fails, the system efficiency drops. If a chilled-water pump motor is operating outside of its nameplate parameters, then the likelihood of an entire cooling system failure is increased. Furthermore, the use of I/O (input/output) status inputs with the monitoring devices increases the alarm capabilities and also the ability to quickly troubleshoot problems associated with a given process.

FIG. 11 is an exemplary "cooling process group" 1100 that includes a number of devices all related to the cooling process exemplified by the cooling system 1000 shown in FIG. 10. The cooling process group 1100 includes monitoring devices $M_1$-$M_5$ that were automatically determined by the process algorithm 400 to be related to this cooling process. The cooling process group 1100 also includes a variety of sensors $T_1$-$T_{10}$, $P_1$-$P_4$, and $F_1$-$F_6$ that were manually configured by the end-user as being related to this cooling process. The approach taken to aggregate these monitoring devices and sensors into a single process group was referred to above as the hybrid approach. Now, when an alarm is indicated by any of these devices, a single process alarm may be indicated to the end-user, who will quickly realize that the process being affected is the cooling process, allowing the end-user to quickly isolate and troubleshoot the problem.

Any of these algorithms include machine readable instructions for execution by: (a) a processor, (b) a controller, and/or (c) any other suitable processing device. It will be readily understood that the computer 132 includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of aggregating monitoring devices and sensors in a utility system into one or more groups, comprising:
   receiving at time intervals device data measured by each of said monitoring devices;
   determining how said monitoring devices are linked together in a hierarchy to produce data representing said hierarchy;
   responsive to said producing said data representing said hierarchy, identifying a first of said monitoring devices that is connected to and directly monitoring a first load in said utility system and a second of said monitoring devices that is connected to and directly monitoring a second load in said utility system;
   determining whether a first correlation coefficient exceeds a threshold value, said first correlation coefficient being calculated from said device data measured by said first monitoring device and from said device data measured by said second monitoring device;
   if said first correlation coefficient exceeds said threshold value, grouping said first device and said second device into a first group as being mutually related to a common process in said utility system; and
   storing in a memory a representation of said first group.

2. The method of claim 1, further comprising:
   automatically calculating a second correlation coefficient associated with each non-identical pair of said monitoring devices indicative of whether said non-identical pair is directly linked, indirectly linked, or not linked together in said hierarchy to produce a plurality of second correlation coefficients; and
   automatically setting said threshold value by:
   determining which of said second plurality of correlation coefficients, associated with said non-identical pairs that are directly linked together or indirectly linked together, has a minimum value; and
   equating said threshold value to said minimum value.

3. The method of claim 1, further comprising:
   receiving sensor data from at least one sensor in said utility system, said sensor data representing at least one characteristic being sensed by said at least one sensor; and
   grouping said at least one sensor into said first group.

4. The method of claim 1, further comprising:
   receiving an alarm communicated from said first device or said second device; and
   displaying an indication that said alarm is associated with said first group.

5. The method of claim 1, further comprising:
   aggregating alarm data associated with said first device and said second device such that an alarm indicated by said first device or said second device is indicated as a single alarm associated with said first group; and
   storing said indication that said alarm is associated with said first group.

6. The method of claim 3, further comprising:
   receiving an alarm associated with an anomaly sensed by said at least one sensor; and
   displaying an indication that said alarm is associated with said first group.

7. The method of claim 1, wherein said first device and said second device are not linked together in said hierarchy.

8. The method of claim 1, further comprising:
   grouping at least a third device into a second group; and
   combining said first group with said second group.

9. The method of claim 1, further comprising breaking up said first group into a plurality of subgroups by disaggregating at least said first device or said second device from said first group into a different group.

10. The method of claim 1, wherein said device data is indicative of at least one of power, voltage, current, voltage distortion, BTU per hour, MBTU per hour, energy, gallons per minute, or cubic feet per minute.

11. The method of claim 1, wherein said utility is selected from the group consisting of water, air, gas, electricity, and steam.

12. The method of claim 1, wherein said devices are monitoring devices that monitor at least one of power, energy, volume per minute, volume, temperature, pressure, or flow rate.

13. A method of aggregating monitoring devices and sensors in a utility system into one or more groups, comprising:
   receiving at time intervals device data measured by each of said monitoring devices;
   automatically determining how said monitoring devices are linked together in a hierarchy to produce data representing said hierarchy;
   responsive to said producing said data representing said hierarchy, identifying a first of said monitoring devices that is connected to a first load in said utility system and a second of said monitoring devices that is connected to a second load in said utility system, wherein said first monitoring device is not necessarily linked to said second monitoring device;
   determining whether a first correlation coefficient exceeds a threshold value, said first correlation coefficient being calculated from said device data measured by said first monitoring device and from said device data measured by said second monitoring device;
   if said first correlation coefficient exceeds said threshold value, identifying said first device and said second device as members of a first group;
   storing in a memory a representation of said first group;
   aggregating alarm data associated with said first device and said second device such that an alarm indicated by said first device or said second device is indicated as a single alarm associated with said first group; and
   storing said indication that said alarm is associated with said first group.

14. The method of claim 13, further comprising:
automatically calculating a second correlation coefficient associated with each non-identical pair of said monitoring devices indicative of whether said non-identical pair is directly linked, indirectly linked, or not linked together in said hierarchy to produce a plurality of second correlation coefficients; and
automatically setting said threshold value by:
determining which of said second plurality of correlation coefficients, associated with said non-identical pairs that are directly linked together or indirectly linked together, has a minimum value; and
equating said threshold value to said minimum value.

15. The method of claim 14, further comprising:
receiving sensor data associated with at least one sensor in said utility system, said sensor data representing at least one characteristic being sensed by said at least one sensor; and
identifying said at least one sensor as a member of said first group.

16. The method of claim 15, further comprising aggregating alarm data associated with said at least one sensor with said alarm data associated with said first device and said second device.

* * * * *